(12) United States Patent
Mack et al.

(10) Patent No.: US 12,560,102 B2
(45) Date of Patent: Feb. 24, 2026

(54) AIR INTAKE

(71) Applicant: Rolls-Royce Deutschland Ltd & Co KG, Blankenfelde-Mahlow (DE)

(72) Inventors: Gregory Mack, Berlin (DE); Mathias Steger, Berlin (DE); Saskia Hischemöller, Storkow (DE); Kjeld Knoben, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 19 days.

(21) Appl. No.: 18/338,545

(22) Filed: Jun. 21, 2023

(65) Prior Publication Data

US 2024/0102419 A1 Mar. 28, 2024

(51) Int. Cl.
*F01D 25/24* (2006.01)
*F02C 7/045* (2006.01)
(Continued)

(52) U.S. Cl.
CPC .............. *F01D 25/24* (2013.01); *F02C 7/045* (2013.01); *F02C 7/055* (2013.01); *F02C 9/18* (2013.01)

(58) Field of Classification Search
CPC .... F02C 7/45; F02C 7/055; F02C 9/18; F05D 2260/96; F01D 25/24
See application file for complete search history.

(56) References Cited

U.S. PATENT DOCUMENTS

| | | | | |
|---|---|---|---|---|
| 5,088,886 A | * | 2/1992 | Hopkins | F04D 29/667 |
| | | | | 415/206 |
| 8,024,935 B2 | | 9/2011 | Hoover | |
| 9,493,233 B2 | * | 11/2016 | Patience | B64C 23/005 |
| 10,487,744 B2 | | 11/2019 | Post | |

(Continued)

FOREIGN PATENT DOCUMENTS

| | | |
|---|---|---|
| EP | 2824033 A1 | 1/2015 |
| FR | 3041380 A1 | 3/2017 |

(Continued)

OTHER PUBLICATIONS

European Search Report dated Nov. 23, 2023 from counterpart European Patent Application No. 23180029.3.

(Continued)

*Primary Examiner* — Michael K. Reitz
(74) *Attorney, Agent, or Firm* — SHUTTLEWORTH & INGERSOLL, PLC; Timothy J. Klima

(57) ABSTRACT

The invention concerns an air inlet in a surface. The air inlet includes an opening in the surface having a longitudinal axis, wherein a fluid is intended to flow over the air inlet in the direction of the longitudinal axis, and wherein the opening has an upstream edge and a downstream edge. The air inlet furthermore comprises an outflow channel which adjoins the opening and extends at an angle to the surface, wherein the outflow channel has an inner wall with an upstream casing surface and a downstream casing surface. It is provided that the opening adjoining the upstream edge is partly or completely covered by a lattice and that the outflow channel has a bulge which protrudes into the outflow channel in the region of its upstream casing surface, constantly increases in thickness in the longitudinal direction of the outflow channel adjoining the upstream edge, forms a thickness maximum ($d_{max}$) and after the thickness maximum ($d_{max}$), constantly decreases in its thickness.

20 Claims, 6 Drawing Sheets

(51) Int. Cl.
    *F02C 7/055*      (2006.01)
    *F02C 9/18*      (2006.01)

(56)        References Cited

U.S. PATENT DOCUMENTS

| | | | |
|---|---|---|---|
| 10,823,055 | B2 | 11/2020 | Joshi |
| 11,300,002 | B2 | 4/2022 | Sidorovich Paradiso |
| 2009/0094989 | A1 | 4/2009 | Kraft |
| 2009/0277714 | A1* | 11/2009 | Putnam .................. F02K 1/827 |
| | | | 181/213 |
| 2010/0126182 | A1 | 5/2010 | Hoover |
| 2012/0128485 | A1* | 5/2012 | Yu ......................... F04D 29/541 |
| | | | 415/220 |
| 2016/0031290 | A1 | 2/2016 | Molin et al. |
| 2017/0335771 | A1* | 11/2017 | Post ......................... F02C 3/04 |
| 2020/0182081 | A1* | 6/2020 | Sidorovich Paradiso .................. |
| | | | F01D 17/14 |
| 2022/0397058 | A1* | 12/2022 | Diosady ................. F02K 1/827 |

FOREIGN PATENT DOCUMENTS

| | | |
|---|---|---|
| GB | 2596339 A | 12/2021 |
| WO | 2006091138 A1 | 8/2006 |

OTHER PUBLICATIONS

Frick, Charles W. [et al.]: An experimental investigation of NACA submerged-duct entrances. Washington: National Advisory Committee for Aeronautics, Oct. 1945 (Advance confidential report; 5120). 57 S. URL: https://ntrs.nasa.gov/archive/nasa/casi. ntrs. nasa. gov/20050061115.pdf [abgerufen am Sep. 23, 2013].

Moreau, Stéphane [et al]: Optimization of tonal noise control with flow obstruction. 17th International Symposium on Transport Phenomena and Dynamics of Rotating Machinery (ISROMAC2017), Dec. 2017, Maui, United States. hal-03004962 Publication Date: Nov. 13, 2020.

\* cited by examiner

AIR INTAKE

This application claims priority to German Patent Application 102022115659.1 filed Jun. 23, 2022, the entirety of which is incorporated by reference herein.

The invention relates to an air inlet as per the present disclosure.

On a surface exposed to flow, it is known to form an air inlet through which air is conducted into an outflow channel. An example of a known inlet is the so-called NACA inlet, first described by Frick, Charles W., et al. NACA ACR No. 5120: "An Experimental Investigation of NACA Submerged-Duct Entrances", NACA, 13 Nov. 1945.

In the design of advantageous air inlets, one challenge is that these must be optimised with respect to fluid-dynamic losses not only for the opened state when air flows through the outflow channel, but also taking into account the state when the outflow channel is closed (e.g. by a valve). In the latter case, due to aero-acoustic feedback mechanisms, the air flowing past creates resonances in the outflow channel which are acoustically relevant.

The present invention is based on the object of providing an air inlet which is advantageous both with respect to its acoustic properties and also with respect to its aerodynamic properties, i.e. it reduces both acoustic resonances and aerodynamic flow losses.

This object is achieved by an air inlet having features as disclosed herein. Design embodiments of the invention are also disclosed herein.

Accordingly, the invention concerns an air inlet in a surface over which a fluid is intended to flow. The air inlet comprises an opening having a longitudinal axis, wherein the fluid should flow over the air inlet in the direction of the longitudinal axis. The opening has an upstream edge and a downstream edge. The air inlet furthermore comprises an outflow channel which adjoins the opening and extends at an angle to the surface. The outflow channel has an inner wall with an upstream casing surface and a downstream casing surface, wherein the upstream casing surface adjoins the upstream edge of the opening, and the downstream casing surface adjoins the downstream edge of the opening.

It is provided that the opening adjoining the upstream edge is partly or completely covered by a lattice and that the outflow channel has a bulge which protrudes into the outflow channel in the region of its upstream casing surface, constantly increases in thickness in the longitudinal direction of the outflow channel adjoining the upstream edge, forms a thickness maximum and after the thickness maximum, constantly decreases in its thickness.

The solution according to the invention is based on the concept of reducing fluid-mechanical losses which are associated with a flow separation, in that a flow separation is shifted downstream into the outflow channel by providing a bulge formed in the outflow channel, and the extent of a separation zone is reduced. This solution is based on the knowledge that a geometry-induced flow separation takes place at a non-constant (sharp-edged) transition into the outflow channel. The sharp edge marks the start of the separation zone. The extent of the separation zone is influenced by the angle at which the outflow channel stands relative to the surface under the flow or to main flow direction, the parameters of the flow such as e.g. flow speed and flow turbulence, and the mass flow extracted through the outflow channel. Because of the bulge which is provided according to the invention in the outflow channel adjoining the upstream edge of the opening, the flow separation can be shifted downstream into the outflow channel and the extent of the separation zone reduced. A sharp-edged transition is replaced by the bulge. These considerations apply to the case in which the flow channel is open and air flows through.

The invention is based on the further concept of combining a bulge at the upstream casing surface of the outflow channel with the provision of a lattice which is arranged on the opening at least adjacent to the upstream edge. By providing a lattice, acoustic resonances when the outflow channel is closed are reduced, since the lattice mixes up coherent flow structures which lead to the formation of resonances.

By combining an upstream bulge with a lattice, the properties of the outflow channel are improved with respect to avoiding aero-acoustic resonances when the outflow channel is closed and fluid-mechanical losses when the outflow channel is open. The bulge in the outflow channel also improves the resonance-reducing effect of the lattice. This is achieved by shifting the flow separation from the leading edge, or the upstream edge of the opening, downstream into the outflow channel. The shift of the flow separation also influences the resulting detached shear layer, such that in conjunction with the lattice, the excitation of acoustic resonances is effectively reduced.

A further advantage associated with the present invention is that the described aspects of the invention are achieved without attaching flow-influencing geometries outside the outflow channel.

The necessary structural measures are restricted exclusively to the outflow channel, whereby the basic geometry of the opening remains unchanged. Thus the described invention is also suitable for geometrically restricted conditions and allows simple adaptation of existing systems, which is not the case with the NACA inlet. In addition, by avoiding blocking elements in the main flow, the occurrence of additional fluid-mechanical losses is prevented.

In particular, no additional specific structural measures are required with respect to the formation of the opening in the boundary of the main flow, as is the case with the NACA inlet. This solution according to the invention, which is structurally simple to implement, avoids fluid-mechanical losses in the main flow.

It is pointed out that in the sense of the present invention, the upstream casing surface of the outflow channel means the side of the outflow channel which adjoins the upstream edge of the opening and faces the flow direction. In the case of a circular cross-section of the outflow channel, the upstream casing surface is formed in cross-section by the 180° arc which is arranged upstream relative to the flow direction. The downstream casing surface is accordingly formed by the opposite 180° arc.

In an embodiment of the invention, the contour of the bulge in a starting region forms a tangential transition to the upstream edge of the opening, and in an end region forms a tangential transition to a base form of the outflow channel. The base form of the outflow channel means the form of the outflow channel without the bulge. For example, this is a form with circular cross-section. In this case, the contour of the bulge in the end region transforms tangentially into the circular form of the outflow channel.

In a further embodiment of the invention, the bulge is curved more greatly upstream of the thickness maximum than downstream of the thickness maximum. Such a contour of the bulge minimises the flow breakaway.

In a further embodiment of the invention, it is provided that the local thickness of the bulge varies in the circumferential direction and assumes a maximum between two side edges of the bulge. The bulge thus has a defined course firstly in the longitudinal direction and secondly in the circumferential direction, wherein the bulge forms a maximum in both directions. This means in particular that the course of the bulge varies in the circumferential direction for each longitudinal position of the bulge.

The two side edges of the bulge, between which the thickness of the bulge varies in the circumferential direction, are here for example spaced apart in the circumferential direction by maximum 180°. The side edges may be straight or curved. In an embodiment variant, it is provided that the bulge is formed symmetrically in the circumferential direction relative to the side edges, and thus the bulge is formed symmetrically at the upstream casing surface of the flow channel.

It may be provided that the bulge is maximal at the upstream casing surface in a longitudinal section of the outflow channel which runs through the longitudinal axis of the opening and hence centrally through the outflow channel. Such a longitudinal section defines the plane of symmetry of the bulge.

A further embodiment provides that the bulge extends over a length which lies between once and twice the inner diameter of the outflow channel. It may furthermore be provided that in the longitudinal direction of the outflow channel, the bulge has its thickness maximum in the region between one quarter and one half, in particular after one third of its total length.

An embodiment provides that the outflow channel has a circular cross-section and the opening is elliptical. The shape of the opening arises generally from the section of the sloping outflow channel with the surface in which the opening is formed. If the opening is formed elliptical, the upstream edge of the opening is formed by a curve. Correspondingly, the downstream edge of the opening is formed by a curve. The longitudinal axis of the opening then passes through the two vertices of the ellipse. In other embodiments, the opening may be rectangular or generally polygonal. In the case of a rectangular opening, the upstream side of the rectangle forms the upstream edge, and the downstream side of the rectangle forms the downstream edge.

In a further embodiment of the invention, the lattice covering the opening has first mutually parallel lattice bars and second mutually parallel lattice bars, wherein the first lattice bars and the second lattice bars cross one another and run obliquely to the longitudinal axis of the opening. Accordingly, the lattice bars are oriented neither parallel nor at right angles to the flow direction.

The lattice bars may be formed as bars, or alternatively be formed as rods by punching from a sheet or by other cutting processes.

Here, the lattice bars have a diameter which lies in the range between 1/200 and 8/200 of the inner diameter of the outflow channel. In a first approximation, the diameter of the lattice bars may be taken as 1/100 of the inner diameter of the outflow channel. The lattice bars are thus designed comparatively thin in relation to the outflow channel or opening. For the lattice diameter, a compromise must be found between minimum flow losses and the requirements for structural strength.

The mesh width depends on the parameters of the incoming flow, in particular the flow speed and turbulence. In some exemplary embodiments, it is dimensioned such that the first lattice bars and the second lattice bars have a mutual distance apart which lies in the range between 1/20 and 4/20 of the inner diameter of the outflow channel. The mesh width here forms a compromise between firstly minimal blocking of the outflow channel (achieved by a large mesh width) and secondly optimal mixing of the coherent structures which are defined by the main flow (achieved by a small mesh width). Accordingly, a reduction in mesh width may further reduce possible acoustic resonances.

In some exemplary embodiments, the lattice bars are formed with circular or polygonal cross-section. Alternatively, it may be provided that the lattice bars are formed in cross-section as aerodynamically shaped blade profiles which deflect the passing fluid into the outflow channel with minimal losses. Such a design variant is particularly advantageous when the lattice bar diameter is comparatively large in relation to the inner diameter of the outflow channel, this ratio being for example more than 1/20.

A further embodiment provides that the lattice is formed exclusively adjoining the upstream edge of the opening and ends in front of the downstream edge of the opening, forming a trailing edge. The trailing edge of the lattice may be straight or curved. With such a design, only the upstream part of the extraction opening is thus covered. For example, only the upstream first half of the extraction opening is covered with the lattice. Such a design has the advantage of securely preventing any blocking of the extraction opening and associated flow losses, since the downstream part of the extraction opening is not covered by the lattice. The area of the opening covered by the lattice constitutes a compromise between firstly minimal flow losses on mass flow extraction through the opened outflow channel, and secondly an efficient mixing of the turbulent structures in the closed application case (with flow channel closed and no mass flow extraction).

However, embodiments may also occur in which the opening is completely closed by the lattice.

It is pointed out that the surface under the flow and in which the opening is formed is configured flat in some embodiments. However, this is not necessarily the case. In the case of a curved surface and correspondingly curved opening, the lattice is adapted to the course of the opening.

A further embodiment of the invention provides that the bulge is formed as an insert which can be inserted in the outflow channel. Such a design allows the bulge to be provided as an adaptation to a pre-existing outflow channel. The insert may be produced for example by 3D printing or other methods of shaping a metal sheet. The provision of the bulge in an insert however constitutes merely one design variant. In alternative embodiments, it may be provided that the bulge is formed integrally with the outflow channel.

One embodiment variant here provides that in addition to the bulge, the insert also comprises the lattice. The bulge and lattice may in this manner be provided jointly. Such a design is advantageous in that by the fixing of the insert in the outflow channel (e.g. via bored holes), the lattice is also securely attached and positioned in the opening.

It is pointed out that the surface in which the opening is formed necessarily has a thickness which results from the distance between the outside and inside of the surface. Accordingly, the opening has a corresponding thickness. One embodiment here provides that the bulge extends into the opening from the outside of the surface, in order to shift a flow separation effectively downstream into the outflow channel.

In a further inventive aspect, the invention concerns a gas turbine engine having at least one surface, wherein the surface has an air inlet according to claim 1. The surface concerned is for example the surface of an engine nacelle or the surface of a casing of an engine core. It is pointed out that the invention is provided on a gas turbine engine merely as an example. In general, the described invention may be used for further internal and external flows.

The invention will be explained in more detail below on the basis of a plurality of exemplary embodiments with reference to the figures of the drawing. In the drawing.

Figure 1:
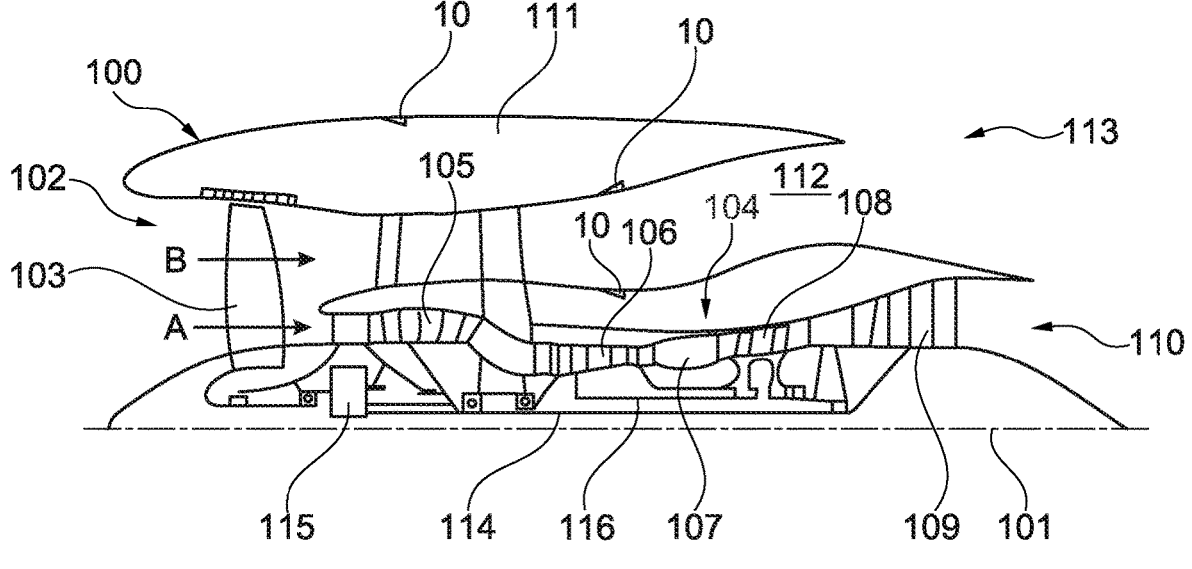
FIG. 1 shows a sectional side view of a gas turbine engine in which the present invention can be realized.

FIG. 1 illustrates a gas turbine engine 100 having a main axis of rotation 101. The engine 100 comprises an air intake 102 and a thrust fan 103 that generates two air flows: a core air flow A and a bypass air flow B. The gas turbine engine 100 comprises a core 104 which receives the core air flow A. In the sequence of axial flow, the engine core 104 comprises a low-pressure compressor 105, a high-pressure compressor 106, a combustion device 107, a high-pressure turbine 108, a low-pressure turbine 109, and a core thrust nozzle 110. An engine nacelle 111 surrounds the gas turbine engine 100 and defines a bypass duct 112 and a bypass thrust nozzle 113. The bypass air flow B flows through the bypass duct 112. The fan 103 is attached to and driven by the low-pressure turbine 109 by way of a shaft 114 and an epicyclic gear box 115.

During use, the core air flow A is compressed by the low-pressure compressor 105 and directed into the high-pressure compressor 106, where further compression takes place. The compressed air expelled from the high-pressure compressor 106 is directed into the combustion device 107, where it is mixed with fuel and the mixture is combusted. The resultant hot combustion products then propagate through the high-pressure and the low-pressure turbine 108, 109 and drive the latter as a result, before said combustion products for providing a specific thrust force are ejected by the nozzle 110. The high-pressure turbine 108 drives the high-pressure compressor 106 by means of a suitable connecting shaft 116. The fan 103 generally provides the major part of the thrust force. The epicyclic gear box 115 is a reduction gear box.

The geometry of the gas turbine engine 100, and components thereof, is/are defined by a conventional axis system, which comprises an axial direction (which is aligned with the rotation axis 101), a radial direction (in the direction from bottom to top in FIG. 1), and a circumferential direction (perpendicular to the view in FIG. 1). The axial, radial and circumferential directions are perpendicular to one another.

FIG. 1 shows schematically that air inlets 10 may be integrated into the surfaces of the gas turbine engine, e.g. in the surface of the nacelle 111 or in the surface of a casing of the engine core 104. Furthermore, they may for example also be arranged on the inside of the nacelle 111, and at further interior positions of the engine core 104. Various exemplary embodiments of such air inlets 10 are explained below.

Figure 2:
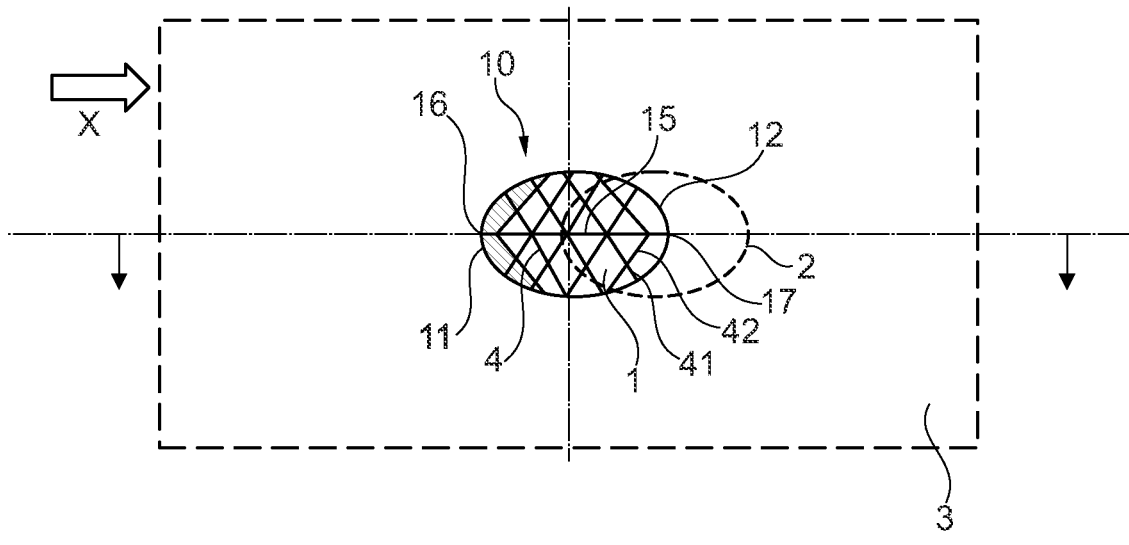
FIG. 2 shows a plan view of an exemplary embodiment of an air inlet having an opening and an outflow channel adjoining this, wherein the opening is covered with a lattice and the outflow channel forms an upstream bulge.
Figure 3:
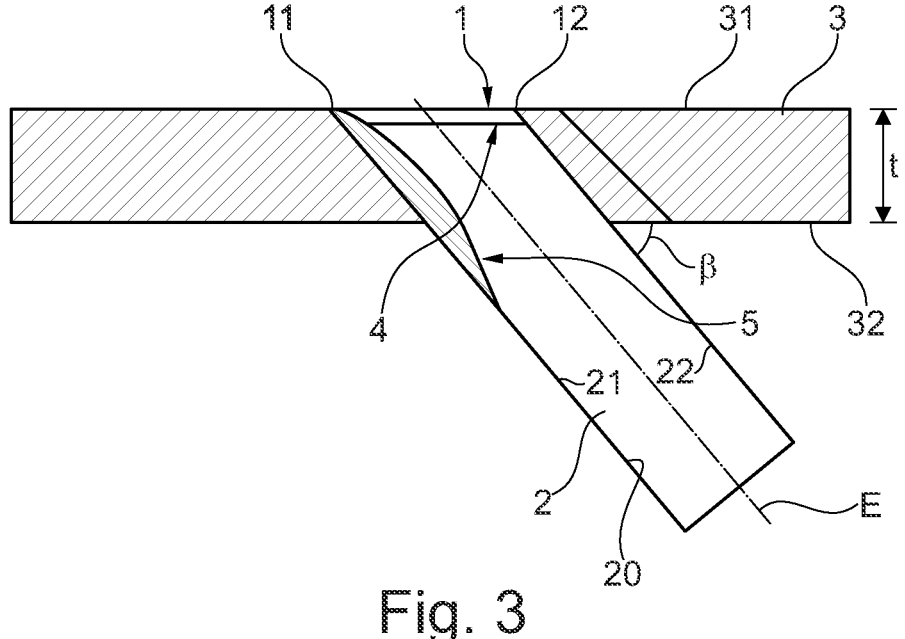
FIG. 3 shows the air inlet from FIG. 2 in a sectional view.

FIGS. 2 and 3 show a first exemplary embodiment of an air inlet 10. The air inlet 10 comprises an opening 1 in a surface 3, and an outflow channel 2 adjoining the opening 1. The surface 3 may be a flat or alternatively a curved surface. For example, it is a curved surface of a main flow channel from which the outflow channel 2 branches. A fluid, for example air, flows over the air inlet 10 in a flow direction X. The opening 1 is shown in the figures as a planar opening; it may however also have a curvature in the case of a curved surface 3.

The opening 1 has an upstream edge 11 and a downstream edge 12. In the exemplary embodiment shown, it is elliptical, but this is not necessarily the case. At the same time, the outflow channel 2 has a circular cross-section. Accordingly, the upstream edge 11 and the downstream edge 12 of the opening 1 are each curved. The opening 1 furthermore comprises a longitudinal axis 15 which intersects the opening 1 centrally or in the plane of symmetry. The longitudinal axis 15 runs from the upstream edge 11 to the downstream edge 12 and thus has a direction which corresponds to the flow direction X. To improve stability, an elongate structure may but need not be formed on the longitudinal axis 15. The intersection points 16, 17 of the longitudinal axis 15 with the upstream edge 11 and downstream edge 12 constitute the vertices of the elliptical opening 1.

The outflow channel 2 extends at an angle to the surface 3. It has a longitudinal axis E which forms an acute angle β with the surface 3 or longitudinal axis 15. The acute angle β results from aerodynamic aspects relating to the air extraction with low flow losses. In channels configured for air discharge, straight or obtuse angles β are usually applied. The invention described may nonetheless be used to prevent acoustic resonances in air discharge channels which are closed for example by a valve. However, it must be noted that in the case of air discharge, the bulge makes no contribution to improving the aerodynamics in the open state.

In the exemplary embodiment illustrated, the outflow channel 2 is shown as a straight tube. The outflow channel 2 may alternatively be curved, wherein at least locally it has a hollow cylindrical form adjoining the opening 1. The outflow channel 2 according to FIG. 3 has an inner wall 20 with an upstream casing surface 21 and a downstream casing surface 22. The upstream casing surface 21 adjoins the upstream edge 11 of the opening 1, and the downstream casing surface 22 adjoins the downstream edge of the opening 1.

The casing surfaces 21, 22 here extend over an angular region of 180° in the circumferential direction and together form the entire casing surface of the inner wall 20. FIG. 3 shows a section through the vertices 16, 17 of the opening 1.

The opening 1 is covered by a lattice 4 in FIGS. 2 and 3. The lattice 4 extends over the entire area of the opening 1. In alternative embodiments, the lattice 4 extends only adjoining the upstream edge 11 and ends spaced from the downstream edge 12, as explained with reference to FIGS. 9-11. The lattice 4 has first mutually parallel lattice bars 41 and second mutually parallel lattice bars 42 which cross one another and run obliquely to the longitudinal axis 15 of the opening 1.

In the region of its upstream casing surface 21, the outflow channel 2 has a bulge 5 protruding into the outflow channel 2. Here, the bulge 5 adjoins the upstream edge 11 of the opening 1. Starting from here, it extends in the direction of the longitudinal axis E of the outflow channel 2, wherein its thickness initially increases constantly, reaches a thickness maximum and after the thickness maximum decreases again constantly. This is shown in detail in FIG. 4.

Figure 4:
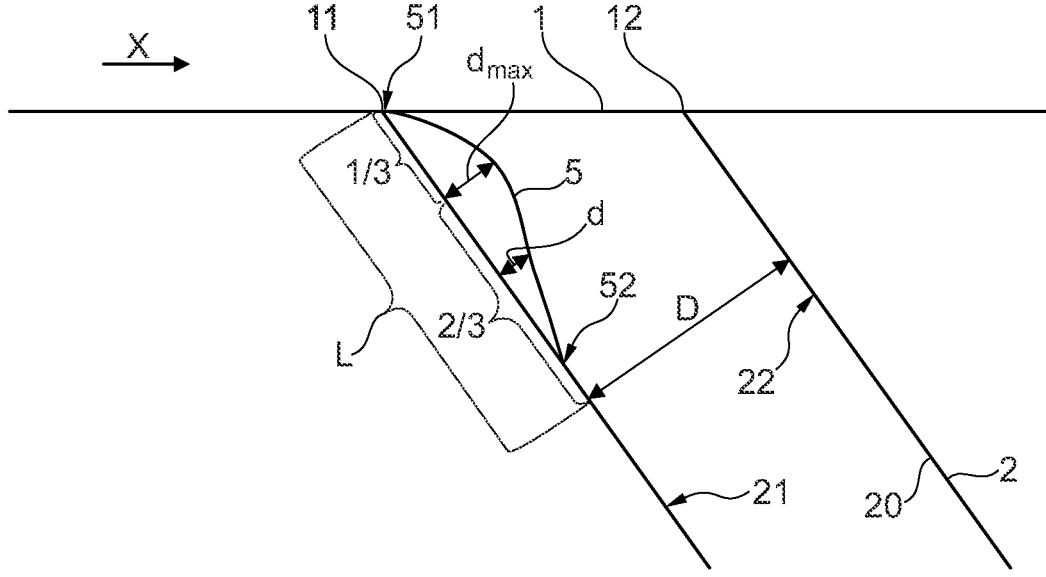
FIG. 4 shows an exemplary embodiment of an upstream bulge in an outflow channel of an air outlet in cross-section.

According to FIG. 4, in a starting region adjoining the upstream edge 11 of the opening 1, the bulge 5 has a tangential transition 51 to the upstream edge 11. From here, the thickness d of the bulge 5 increases up to a maximum value $d_{max}$ designated the thickness maximum. Following this maximum value, the thickness d decreases again and, in an end region, the bulge 5 forms a tangential transition 52 into the circular base form of the outflow channel 2. It does so such that the bulge 5 is curved more greatly upstream of the thickness maximum $d_{max}$ than downstream of the thickness maximum $d_{max}$. The exemplary embodiment illustrated provides that, in the longitudinal direction of the outflow channel 2, the bulge 5 reaches its thickness maximum $d_{max}$ after one third of its total length L. The distance between the point of its longitudinal extent at which the bulge 5 reaches its thickness maximum $d_{max}$ and the tangential transition 52 accordingly amounts to ⅔ of the total length L of the bulge 5. This is however to be understood merely as an example.

The total length L of the bulge in some exemplary embodiments is between once and twice the inner diameter D of the outflow channel 2. In the exemplary embodiment illustrated, the ratio L/D is 1.5.

According to FIG. 3, the surface 3 has an outside 31 and an inside 32. The distance between the outside 31 and the inside 32 defines a thickness t of the surface which also defines the thickness t of the opening 1. It is evident in particular from FIG. 3 that the bulge 5 extends into the opening from the outside 31 of the surface 3, i.e. with its upstream edge, the bulge 5 forms a tangential transition 51 to the outside 31 of the upstream edge 11.

Figure 5:
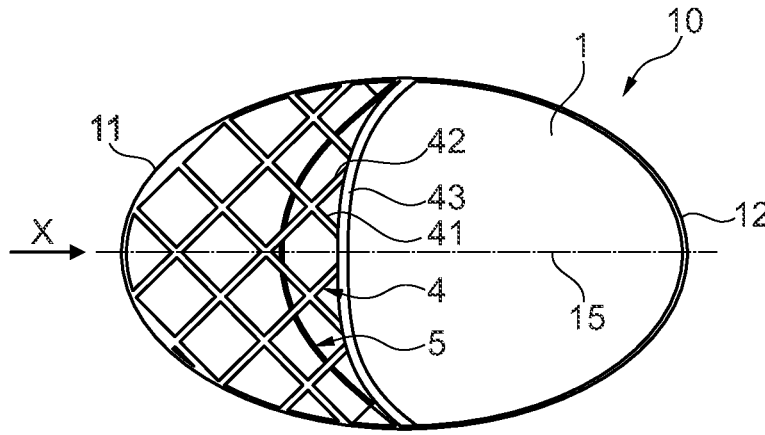
FIG. 5 shows a schematic plan view of an opening of an air inlet with a lattice adjoining its upstream edge.

FIG. 5 shows an exemplary embodiment in which the lattice 4 covering the opening 1 is formed exclusively adjoining the upstream edge 11 of the opening and forms a trailing edge 43 which ends in front of the upstream edge 12 of the opening 1. Thus the trailing edge 43 is curved concavely. This ensures that part of the flow introduced into the outflow channel 2 can flow into the outflow channel 2 with minimal fluid-mechanical losses. The shape of the trailing edge is designed according to the flow lines of the air extraction mass flow, and in a first approximation may be curved similarly to the upstream leading edge 11, as shown in FIG. 5.

According to FIG. 5, the lattice 4 again has first and second mutually parallel lattice bars 41, 42 which cross one another. The lattice bars 41, 42 run obliquely to the longitudinal axis 15 of the opening 1. The lattice bars 41, 42 may be circular in cross-section. Alternatively, it may be provided that the lattice bars are formed in cross-section as aerodynamically shaped blade profiles which partially deflect the passing fluid into the outflow channel 2. This is particularly useful if the lattice bars 41, 42 have a comparatively large diameter.

In some embodiment variants, it is provided that the lattice bars 41, 42 are circular in cross-section and have a diameter which lies in the range between 1/200 and 8/200 of the inner diameter D of the outflow channel 2. For example, the lattice bars 41, 42 have a diameter of 1/100 of the inner diameter D of the outflow channel. The mesh width of the lattice 4 lies for example in the range between 1/20 and 4/20 of the inner diameter D of the outflow channel 2, for example 1/10 of the inner diameter D. On use of lattices with comparatively small material thicknesses, the lattice bars may also have square or rectangular cross-sections and be punched or laser-cut directly from sheet metal. In such a case, the exemplary numerical values given for the diameter apply accordingly to the diagonal of the rectangle.

Figure 6:
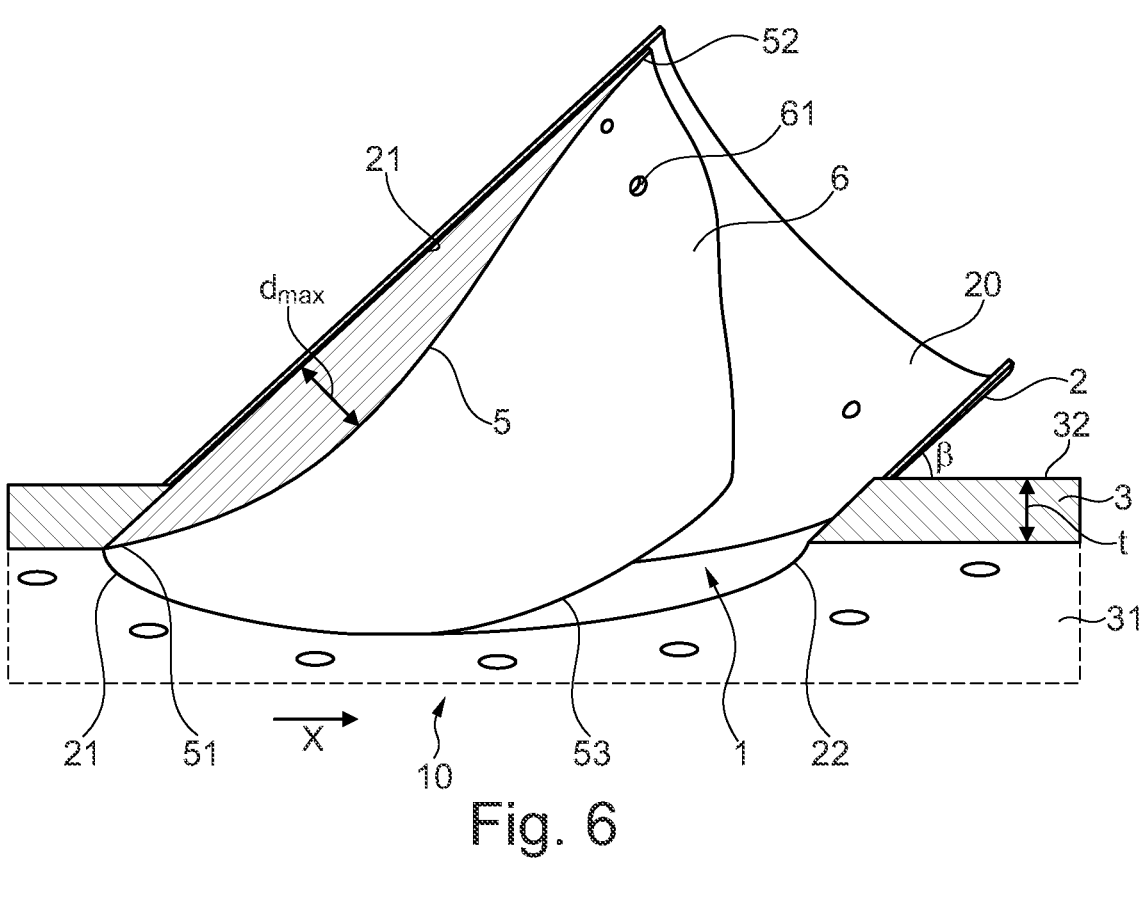
FIG. 6 shows a perspective, partially sectional illustration of an insert with a bulge which is inserted in an outflow channel of an air inlet.

FIG. 6 shows in a perspective illustration an exemplary embodiment of an air inlet 10 which in fundamental structure corresponds to the air inlet in FIGS. 2 and 3. It is pointed out that the illustration differs insofar as, in FIG. 6, the outflow channel 2 extends obliquely upward. The flow direction of the fluid is again indicated with X.

With respect to the fundamental structure, reference is made to the statements relating to FIGS. 2 to 4. In the illustration of FIG. 6, it is evident that the bulge 5 not only has a course in the longitudinal direction of the outflow channel 2, but also a course in the circumferential direction. In the longitudinal direction of the outflow channel 2, as explained, the bulge 5 has a thickness maximum $d_{max}$. In the circumferential direction, the thickness d of the bulge 5 also varies. In the circumferential direction, the bulge 5 assumes a maximum thickness between two side edges 53, wherein FIG. 6 shows one of the side edges 53. The bulge 5 as a whole is symmetrical and thus runs between two such side edges 53. The maximum thickness of the bulge 5 in the circumferential direction is reached along the plane formed by the longitudinal axis 15 of the opening 1, i.e. at the upstream casing surface 21, the bulge 5 is maximal in a longitudinal section of the outflow channel which runs through the longitudinal axis 15 of the opening 1 and hence centrally through the outflow channel 2.

In the exemplary embodiment of FIG. 6, it is provided that the bulge 5 is formed on an insert 6 which can can be inserted in the outflow channel 2. Bored holes 61 are provided for fixing the insert 3 in the outflow channel 2. The formation of the bulge 5 on an insert 6 allows the bulge 5 to be later fitted in previously installed air inlets 10. The insert 6 may here be formed for example by 3D printing, injection moulding or further shaping techniques. Alternatively, the bulge 5 is integrated directly in the inner wall 20 of the outflow channel 2.

It is furthermore evident from FIG. 6 that the bulge 5 extends from the outside 31 of the surface 3 where it forms a tangential transition 51 to the upstream edge 11 of the opening 1.

Figure 7:
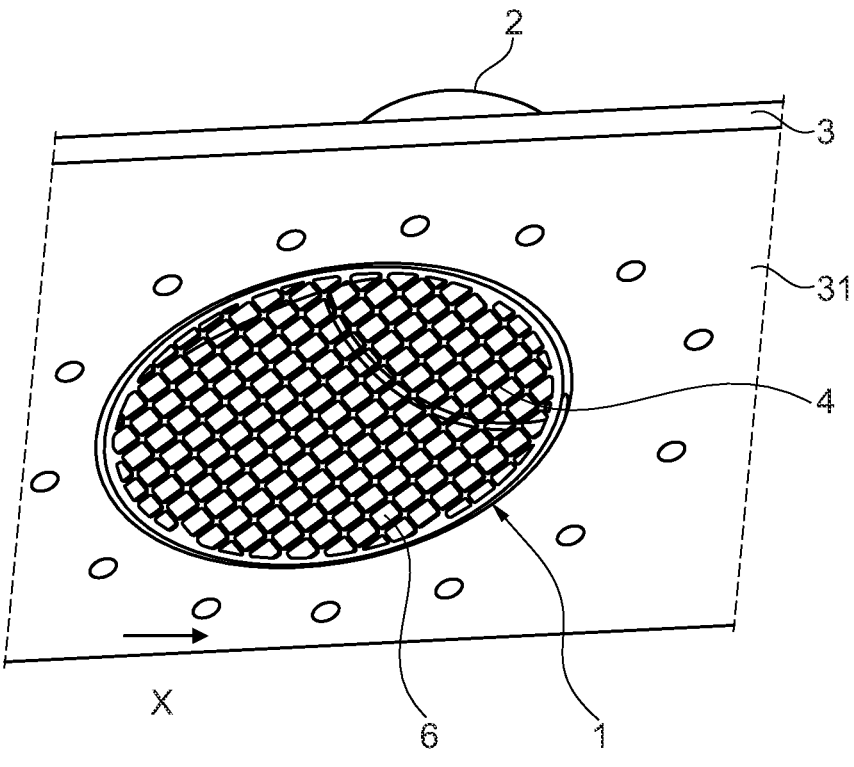
FIG. 7 shows an arrangement corresponding to FIG. 6 in a plan view, wherein the insert also comprises a lattice completely covering the opening.

FIG. 7 shows the air inlet 10 from FIG. 6 in a view obliquely from above onto the outside 31 of the surface 3, wherein the lattice 4 covering the opening 1 is also shown. Here, the lattice 4 completely covers the opening 1, corresponding to the embodiment of FIGS. 2 and 3. In the exemplary embodiment of FIG. 7, the lattice is formed by punching of a sheet metal, which can also be produced by further metal-cutting processes.

Figure 8:
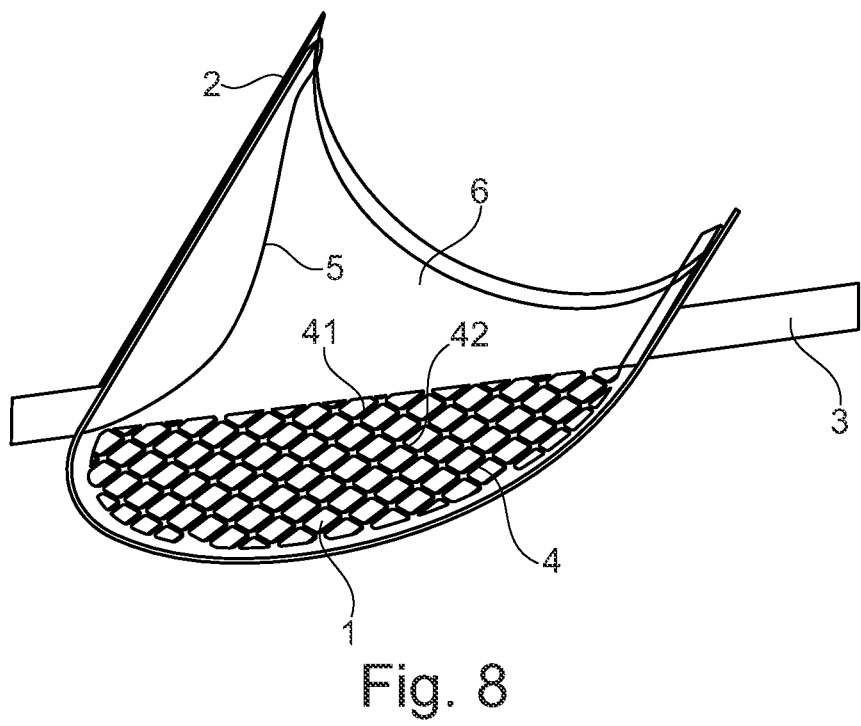
FIG. 8 shows an arrangement corresponding to FIG. 7 in a partial sectional view.

This is shown more precisely in FIG. 8, wherein FIG. 8 shows a partial view of the embodiment variant of FIG. 7. Accordingly, the lattice 4 again comprises lattice bars 41, 42 which cross one another and run obliquely to the longitudinal axis of the opening 1. The lattice bars 41, 42 are however bars with non-circular cross-section. Rather, the lattice bars are formed by structures remaining after punching of a metal sheet, and can also be described as lattice bars in the sense of the present invention since they form parallel-running structures.

Figure 9:
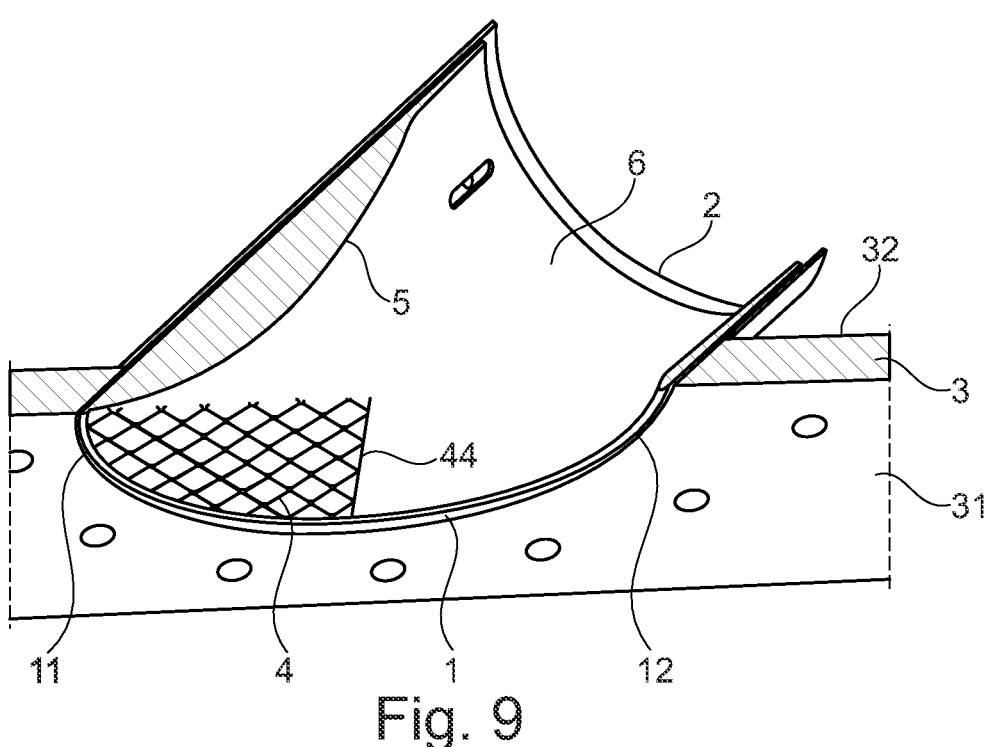
FIG. 9 shows an arrangement corresponding to FIG. 8, wherein the lattice extends only adjoining the upstream edge of the opening and forms a straight trailing edge.

FIG. 9 shows a derivative in which the lattice 4 is formed only adjoining the upstream edge 11 of the opening 1 and forms a straight trailing edge 44.

Figure 10:
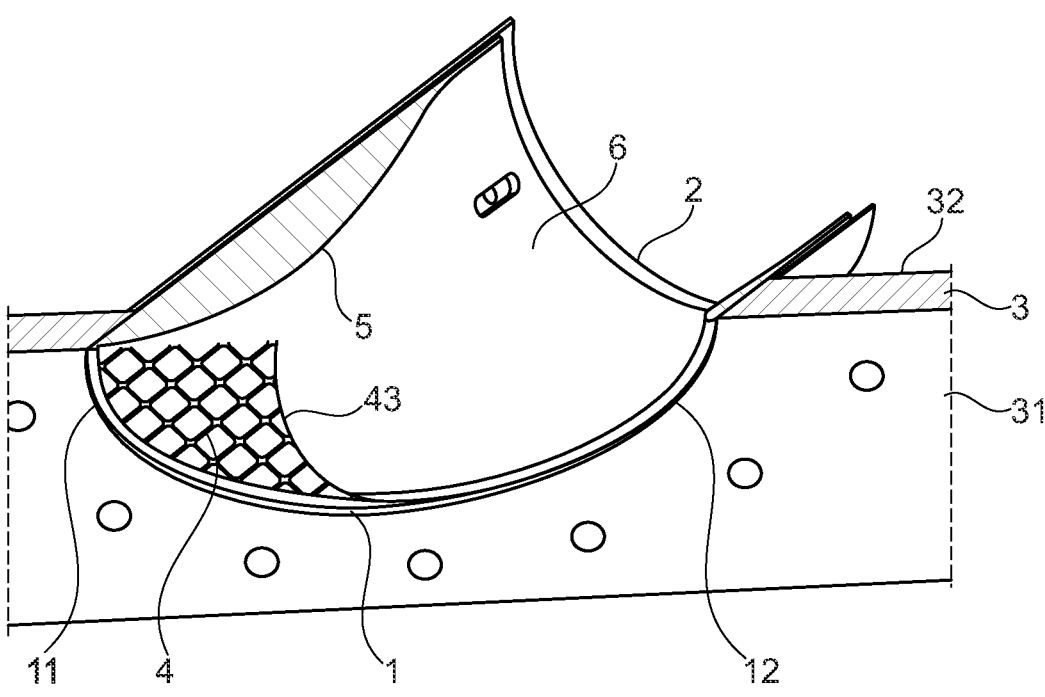
FIG. 10 shows an arrangement corresponding to FIG. 8, wherein the lattice extends only adjoining the upstream edge of the opening and forms a curved trailing edge.
Figure 11:
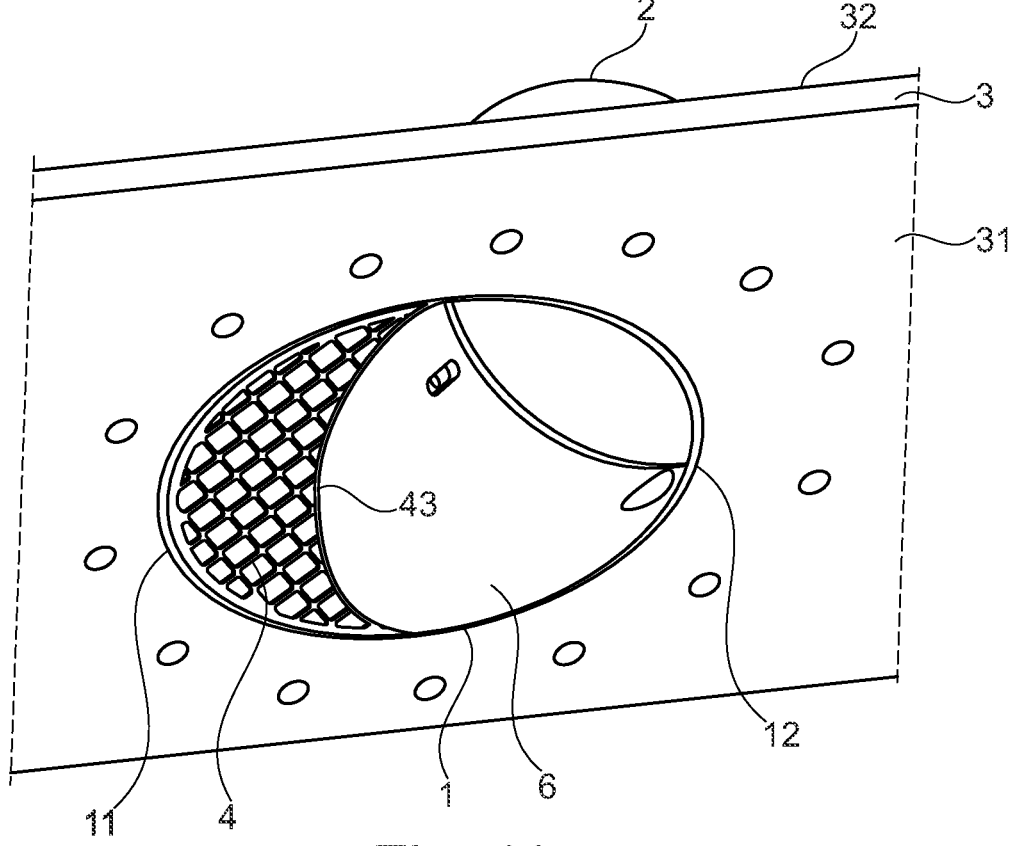
FIG. 11 shows an arrangement corresponding to FIG. 10 in plan view, wherein the lattice is shown completely.

FIGS. 10 and 11 show, in sectional view and in a view onto the outside 31 of the surface 3, a derivative in which the lattice extends only adjoining the upstream edge 11, as in the embodiment of FIG. 5, and forms a concavely curved trailing edge 43 which is spaced from the downstream edge 12 of the opening 1.

It is understood that the invention is not limited to the embodiments described above, and various modifications and improvements can be made without departing from the concepts described herein. It is furthermore pointed out that any of the features described can be used separately or in combination with any other features, provided that they are not mutually exclusive. The disclosure extends to and comprises all combinations and sub-combinations of one or a plurality of features which are described here. If ranges are defined, said ranges therefore comprise all the values within said ranges as well as all the partial ranges that lie within a range.

The invention claimed is:

1. An air routing system, comprising:
   a flow channel extending in a flow direction and configured to conduct a fluid flow in the flow direction, the flow channel bounded by a surface,
   an opening in the surface having a longitudinal axis, such that the fluid flow will flow over the opening in a direction of the longitudinal axis, and wherein the opening has an upstream edge and a downstream edge,
   an outflow channel which adjoins the opening and extends at an angle to the surface, wherein the outflow channel has an inner wall with an upstream casing surface and a downstream casing surface, wherein the upstream casing surface adjoins the upstream edge of the opening, and the downstream casing surface adjoins the downstream edge of the opening,
   wherein the opening adjoining the upstream edge is partially or completely covered by a lattice,
   wherein the outflow channel includes a bulge which protrudes from the inner wall into the outflow channel in a region of the upstream casing surface, and, in a longitudinal direction of the outflow channel adjoining the upstream edge, the bulge constantly increasing in thickness up to a maximum thickness and then constantly decreasing in thickness,
   wherein the bulge and lattice are positioned entirely within the outflow channel and do not extend outward of the outflow channel,
   wherein the bulge starts in a zone adjacent the upstream edge,
   wherein the bulge extends circumferentially in the outflow channel up to a maximum extension of 180° and is circumferentially bounded in the outflow channel by two side edges spaced apart in a circumferential direction of the outflow channel, and wherein a local thickness of the bulge varies in the circumferential direction and assumes a maximum between the two side edges of the bulge,
   wherein the surface of the flow channel is substantially straight immediately upstream of the upstream edge of the opening and immediately downstream of the downstream edge of the opening, in the flow direction, so as not to protrude into the flow channel.

2. The air routing system according to claim 1, wherein the bulge in a starting region forms a tangential transition to the upstream edge of the opening, and in an end region forms a tangential transition to the inner wall of the outflow channel.

3. The air routing system according to claim 1, wherein the bulge has a curved surface and the curved surface has a steeper total first slope upstream of the maximum thickness than a total second slope downstream of the maximum thickness.

4. The air routing system according to claim 1, wherein in the circumferential direction, the bulge is formed symmetrically relative to the side edges.

5. The air routing system according to claim 1, wherein the bulge is maximal at the upstream casing surface in a longitudinal section of the outflow channel which runs through the longitudinal axis of the opening and centrally through the outflow channel.

6. The air routing system according to claim 1, wherein the bulge extends over a length which lies between once and twice an inner diameter of the outflow channel.

7. The air routing system according to claim 1, wherein in the longitudinal direction of the outflow channel, the maximum thickness of the bulge is in a region between an initial one quarter and one half of a total length of the bulge.

8. The air routing system according to claim 1, wherein the outflow channel has a circular cross-section and the opening is elliptical.

9. The air routing system according to claim 1, wherein the lattice covering the opening has mutually parallel first lattice bars and mutually parallel second lattice bars, wherein the first lattice bars and the second lattice bars cross one another and run obliquely to the longitudinal axis of the opening.

10. The air routing system according to claim 9, wherein the lattice bars have a diameter which lies in a range between 1/200 and 8/200 of an inner diameter of the outflow channel.

11. The air routing system according to claim 9, wherein the first lattice bars and the second lattice bars have a mutual distance apart which lies in a range between 1/20 and 4/20 of an inner diameter of the outflow channel.

12. The air routing system according to claim 9, wherein the first and second lattice bars are formed in cross-section as aerodynamically shaped blade profiles which partially deflect the fluid flowing into the outflow channel.

13. The air routing system according to claim 1, wherein the lattice is formed exclusively adjoining the upstream edge of the opening and ends in front of the downstream edge of the opening, forming a trailing edge.

14. The air routing system according to claim 13, wherein the trailing edge runs straight or curved.

15. The air routing system according to claim 1, wherein the bulge is formed on an insert which is inserted in the outflow channel.

16. The air routing system according to claim 15, wherein in addition to the bulge, the insert also comprises the lattice.

17. The air routing system according to claim 1, wherein the opening has a thickness which results from a distance between an outside and an inside of the surface, and the bulge extends into the opening from the outside of the surface.

18. A gas turbine engine comprising the air routing system having according to claim 1.

19. The air routing system according to claim 1, wherein the bulge starts at the upstream edge.

20. The air routing system according to claim 1, wherein at least a portion of the lattice and a portion of the bulge overlap one another.

\* \* \* \* \*